(12) United States Patent
Dunstan et al.

(10) Patent No.: US 8,296,469 B2
(45) Date of Patent: Oct. 23, 2012

(54) SCALABLE METHOD AND APPARATUS FOR LINK WITH RECONFIGURABLE PORTS

(75) Inventors: Robert Dunstan, Forest Grove, OR (US); Ajay Bhatt, Portland, OR (US); Duane Quiet, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/454,155

(22) Filed: May 13, 2009

(65) Prior Publication Data

US 2010/0169523 A1 Jul. 1, 2010

Related U.S. Application Data

(60) Provisional application No. 61/196,719, filed on Dec. 31, 2008.

(51) Int. Cl.
*G06F 3/00* (2006.01)

(52) U.S. Cl. .............................. 710/8; 710/105; 710/106

(58) Field of Classification Search .......... 710/300–315, 710/104–105, 110, 8–19
See application file for complete search history.

(56) References Cited

U.S. PATENT DOCUMENTS

| | | | |
|---|---|---|---|
| 6,665,742 B2 * | 12/2003 | Owen et al. ..................... 710/10 |
| 6,799,235 B2 * | 9/2004 | Bormann et al. ............. 710/110 |
| 7,047,346 B2 * | 5/2006 | Hodapp, Jr. ................... 710/306 |
| 7,293,125 B2 * | 11/2007 | McAfee et al. ............... 710/107 |
| 7,386,638 B2 * | 6/2008 | Voth et al. ....................... 710/10 |
| 7,657,692 B2 * | 2/2010 | Lee et al. ....................... 710/315 |
| 7,779,184 B2 * | 8/2010 | Hubert et al. ................... 710/74 |
| 7,788,428 B2 * | 8/2010 | Melin ............................. 710/62 |
| 2006/0282567 A1 * | 12/2006 | Bhesania et al. ................ 710/52 |
| 2007/0239922 A1 * | 10/2007 | Horigan ........................ 710/307 |
| 2009/0198859 A1 * | 8/2009 | Orishko et al. ............... 710/313 |

* cited by examiner

*Primary Examiner* — Raymond Phan
(74) *Attorney, Agent, or Firm* — International IP Law Group, P.L.L.C.

(57) ABSTRACT

Disclosed herein are reconfigurable ports and methods for doing the same.

17 Claims, 6 Drawing Sheets

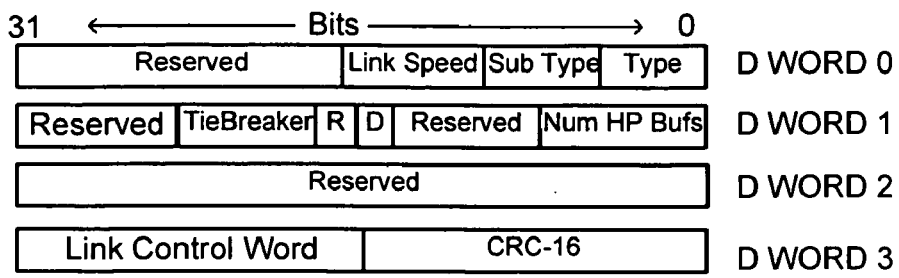

FIGURE 4A

| Width (bits) | Offset DW:bit | Description |
|---|---|---|
| 4 | 0:5 | Sub Type: This field shall be set to port capability |
| 7 | 0:9 | Link Speed: This field is a bit mask that describes the link speeds supported by the device.<br><br>Bits      Description<br><br>0      This bit is set to 1 to indicate the device supports signaling at 5 Gbps<br><br>6:1      Reserved |
| 16 | 0:16 | Reserved (R) |
| 8 | 1:0 | Num HP Buffers: This field specifies the number of header packet buffers (in each direction Transmit or Receive) this device supports. All devices that are compliant to this revision of the specification shall return a value of 4 in this field. All other values are reserved. |
| 8 | 1:8 | Reserved (R) |
| 2 | 1:16 | Direction (D): This field is used to identify the upstream or down stream capabilities of the port. All ports shall have at least one of these bits set.<br><br>Bits      Description<br><br>0      If this bit is set to 1, then the port can be configured to be a downstream port.<br><br>1      If this bit is set to 1, then the port can be configured to be an upstream port. |
| 2 | 1:18 | Reserved (R) |
| 4 | 1:20 | Tiebreaker: This field is only valid when both bits 0 and 1 of the Direction Field are set. This field is used to determine the port type when two devices with both upstream and downstream capability are connected to each other. Otherwise, this field is set to zero. |
| 40 | 1:24 | Reserved (R) |

FIGURE 4B

|  |  | Port 2 | | |
|---|---|---|---|---|
|  |  | Upstream Only | Downstream Only | Both |
| Port 1 | Upstream Only | Not Defined | Port 2 is the downstream port. | Port 2 is the downstream port. |
|  | Downstream Only | Port 1 is the downstream port. | Not Defined | Port 1 is the downstream port. |
|  | Both | Port 1 is the downstream port. | Port 2 is the downstream port. | The port with the higher value in the Tiebreaker field shall be the downstream port. |

FIGURE 4C

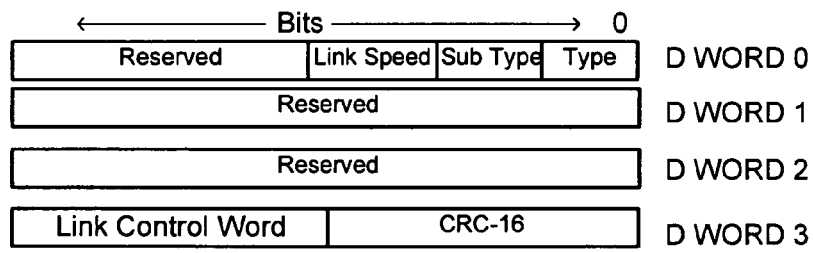

FIGURE 4D

| Width (bits) | Offset DW:bit | Description |
|---|---|---|
| 4 | 0:5 | Sub Type: This field shall be set to port configuration |
| 7 | 0:9 | Link Speed: This field describes the link speed at which the upstream port shall operate. Only one of the bits in this field shall be set in the Port Configuration LMP sent by the link partner configured in the downstream mode.<br><br>Bits    Description<br><br>0    This bit is set to 1 to indicate the device supports signaling at 5 Gbps<br><br>6:1    Reserved |
| 80 | 0:16b | Reserved (R) |

FIGURE 4E

| Width (bits) | Offset DW:bit | Description |
|---|---|---|
| 4 | 0:5 | Sub Type: This field shall be set to port configuration response |
| 7 | 0:9 | Response Code: This field indicates the settings that were accepted in the Port Configuration LMP that was sent to a device. <br><br> <u>Bits</u>  <u>Description</u> <br><br> 0  This bit is set to 1, then the device accepted the Link Speed setting. <br><br> 6:1  Reserved |
| 80 | 0:16 | Reserved |

SCALABLE METHOD AND APPARATUS FOR LINK WITH RECONFIGURABLE PORTS

This application claims the benefit of provisional application No. 61/196,719 filed on Dec. 31, 2008.

TECHNICAL FIELD

The present invention relates generally to links and in particular, to links with reconfigurable ports.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 4A-4G are tables showing formats for a USB 3.0 Link Management Packet configuration message in accordance with some embodiments.

DETAILED DESCRIPTION

Serial bus devices (like PCIe, for example) use low-level link negotiation and handshakes to determine common link configurations. For example, link speed can be negotiated by each side transmitting training sequences at different data rates and using a pass/fail criteria on a handshake sent from each receiving port to determine the common data rate. Although this may be useful with a small set of configuration bits, it may not be as useful if greater capability is desired because training complexity typically increases greatly as configuration requirements increase. Accordingly, with some embodiments of the invention, a generic mechanism is added to group the link/device configuration information into one or more packet(s) (e.g., configuration messages such as Link Management Packets (LMPs) in USB 3.0 and likely beyond), thus avoiding the serialization of the existing methodology very early in the connection process. The hardware required to transmit this information can be the same (structure and latency) for one or many configurations.

Ports are used to establish communication links between devices. Two ports connected over a channel constitute a link. When ports are initially physically connected (e.g., wired or wirelessly) or the link is reset, the link may be trained (also referred to as retrained) to allow the ports to make an effective connection with each other. This process is often referred to as link training.

In some embodiments, techniques are disclosed to enhance link training. For example, they may involve determining the behavior of a port, negotiating bus speed, negotiating power delivery, negotiating port behavior, negotiating buffer depth, and negotiating other capabilities such as, but not limited to, implementing alternate protocols (e.g. PCIe), compression schemes, encryption procedures, and the like. For example, each port may declare to the other if it is a power source, sink or both and the different power ratings to which it can function. Thus, it provides a framework to declare alternative voltages and power levels that the ports may mutually adopt following a link configuration.

Figure 1:
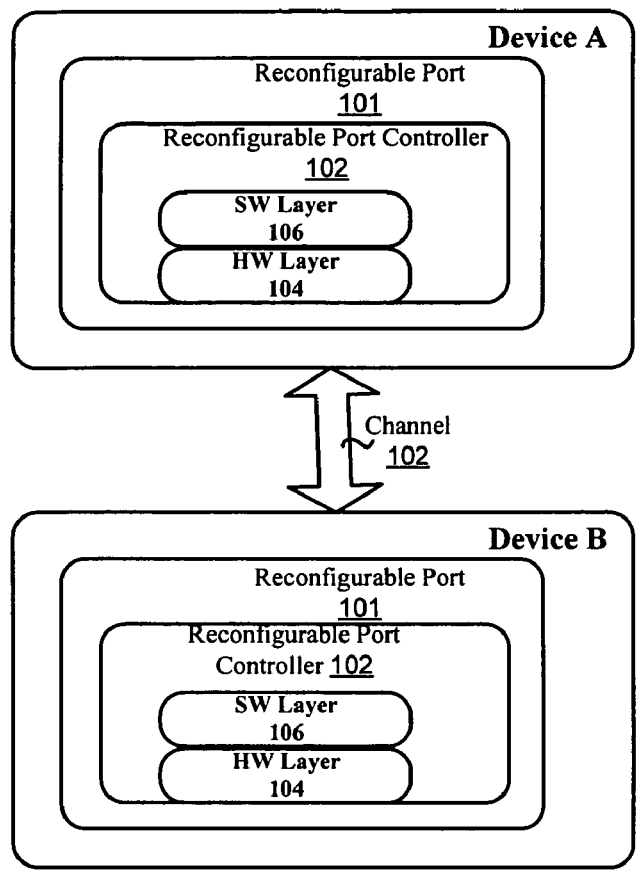
FIG. 1 is a diagram of a link with reconfigurable ports in accordance with some embodiments.

With reference to FIG. 1, a pair of devices (Device A, Device B) having reconfigurable ports (RPs) are linked over a channel 102 (e.g., cable, wireless, etc.) as shown. The term "device" is used generally and refers to any device (e.g., peripheral PC device, hub, PC interface control, etc.). Each device has a reconfigurable port 101 with an RP controller 102. The RP controller may be an actual controller circuit (or portion thereof), or an abstraction implemented with software and/or hardware. It comprises a hardware layer 104 and a software layer 106.

The hardware layer 104 may comprise circuitry within, external to or both within and external to the RP controller 102 itself. The hardware layer comprises circuitry and components for implementing communications. It will typically comprise logic (e.g., in a state-machine) to train the link that connects the ports on Device A and Device B. This may comprise bit lock, symbol lock and equalization processes, among other things.

The software layer may comprise any executable or executing software, dedicated to the RP controller and/or part of a separate processing device. For example, it could comprise firmware and/or code for running the RP controller, along with drivers such as bus drivers and device drivers for communicating with different entities.

Figure 2:
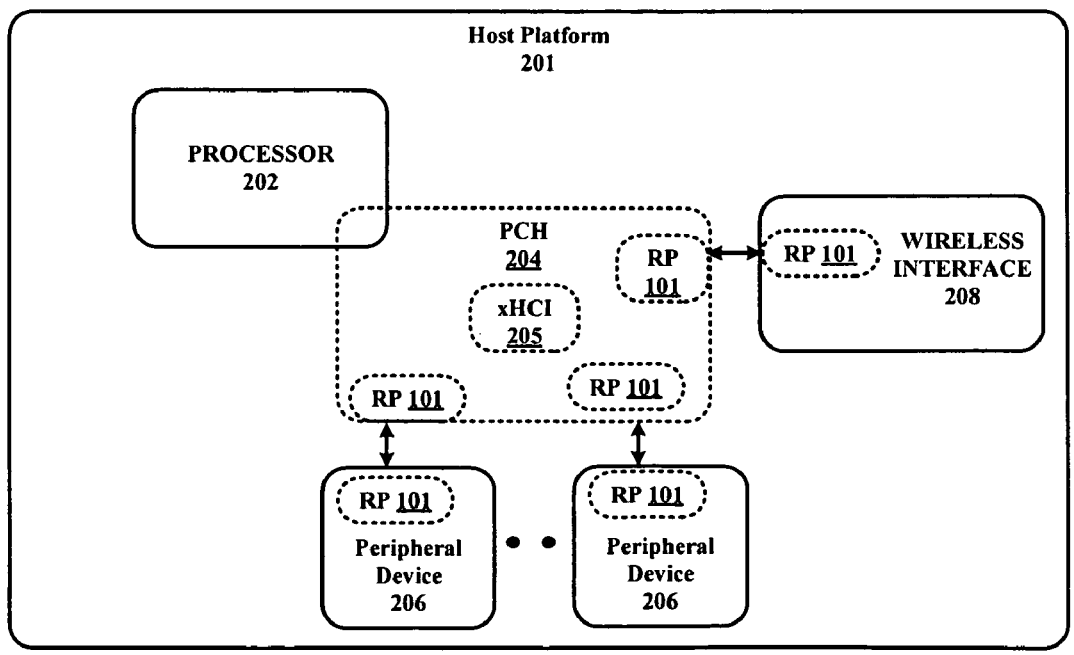
FIG. 2 is a diagram of a computing platform with devices having reconfigurable ports in accordance with some embodiments.

FIG. 2 shows a portion of an exemplary computing platform 201 (e.g., computing system such as a mobile personal computer, PDA, cell phone, or the like). It comprises a processor 202, a platform control hub (PCH) 204, peripheral devises 206 (e.g., printer, mouse, keyboard, etc.), and a wireless interface 208. The PCH comprises a host controller interface (e.g., eXtensible Host Controller Interface for Universal Serial Bus, a.k.a., xHCI) 205 to communicate with peripheral devices and/or hubs attached to the reconfigurable ports 101 in the PCH. The peripheral devices 206 are linked to the PCH through links between their RPs 101 and those in the PCH. Similarly, the wireless interface has a reconfigurable port 101 to link it with the processor 202 through the PCH 204.

In some embodiments, RPs are provided so that a pair of link partners (e.g., devices A, B) can share their capabilities with one another and then reconfigure themselves based on the shared information. In some embodiments, they may use configuration messages to share link capabilities and to agree upon a link configuration. Configuration messages may comprise one or more packets of data and can be structured in any suitable scheme, depending on a defined protocol. For example, USB3 uses a configuration message referred to as a Link Management Packet (LMP, which is defined in the USB 3.0 Bus Specification and described below as an example of a configuration messaging scheme.)

In some embodiments, in addition to using a first configuration message, additional configuration messages and/or negotiations may be used to share additional configuration information and agree upon additional link characteristics. For example, ports to be linked may negotiate configuration into one of several commonly available protocols, a different power mode, or the like.

Figure 3:
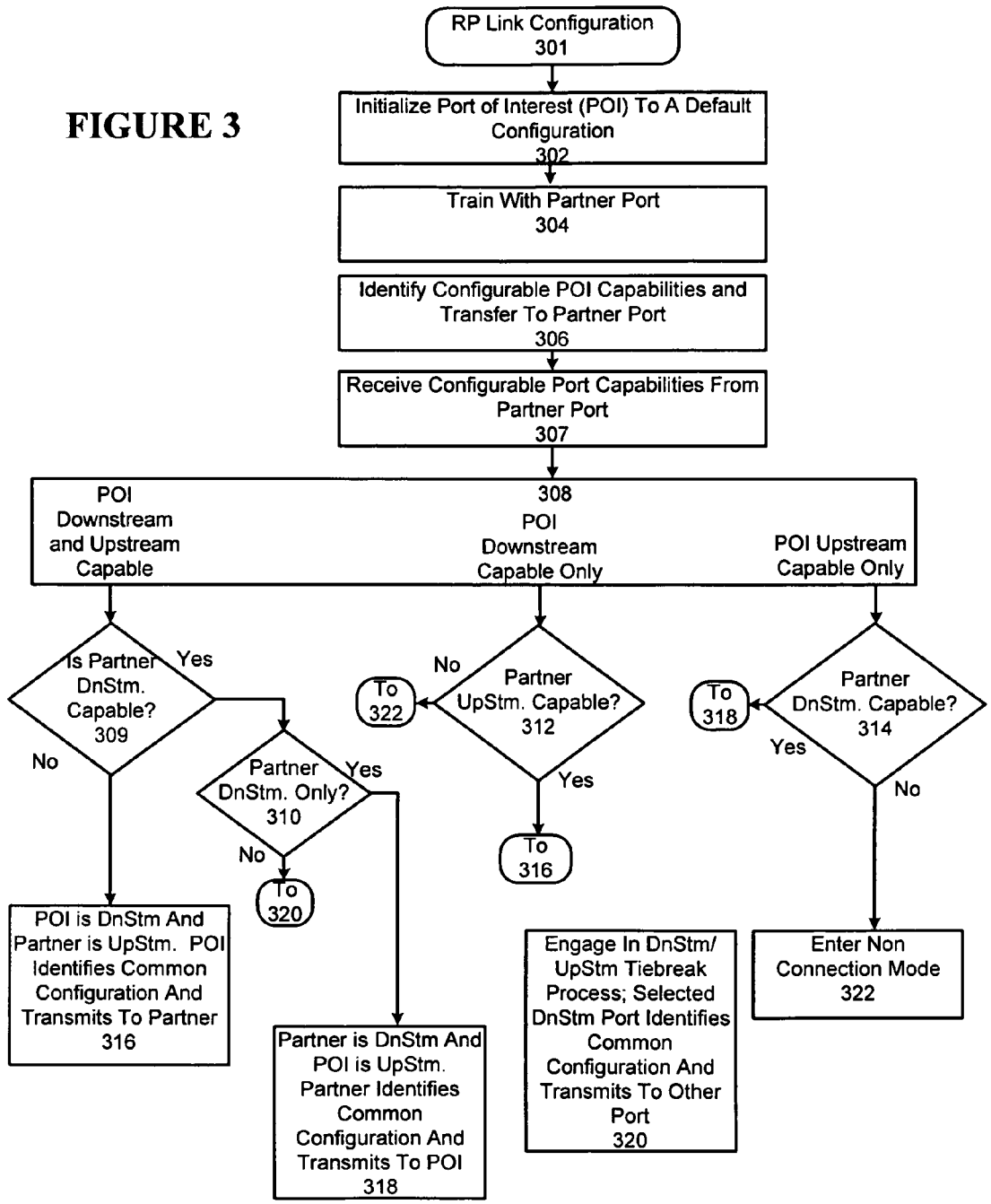
FIG. 3 is a flow diagram of a port reconfiguration method in accordance with some embodiments.

FIG. 3 is a flow diagram of a routine 301 for configuring ports in a link in accordance with some embodiments. for example, The configuration may be negotiated, accepted, and actualized by the ports after the link is reset. The ability to use either HW or SW to configure the link provides a great deal of flexibility. For example, devices, such as ones that support OTG (On-The-Go), would not have to be dependent on host drivers to configure the link. A physical layer, for example, in the device may be able to configure the link and pair with another. Further it provides a mechanism to negotiate alternate power delivery schemes not currently allowed such as a device (e.g. printer) supplying power to a device (e.g. Wireless USB dongle). In some embodiments, a method is provided for a pair of devices to come up to a default configuration for various parameters including, for example, frequency, bus drive levels, bit encoding, compensation, etc.

This routine is described from the point of view of a port of interest (POI), which could be any port, and what it may do to configure itself in cooperation with a partner port (which will work with the POI to configure itself) to establish a link. At 302, the POI is initialized to a default configuration (e.g., power, speed, etc.). Both the POI and partner should come up to suitable default configuration parameters to allow them to train with each other. At 304, the POI trains with the partner (e.g., symbol lock, equalization, etc.).

At 306, the POI identifies its port configuration capabilities and transfers them to the partner via one or more configuration messages (e.g., LMP in USB 3.0). At 307, it receives configurable port capabilities from the partner. (Note that this is not necessarily a sequential exchange. In fact, with USB 3.0, dual simplex transmission whereby two transmission lines (differential pairs in parallel) are used, one transmitting from the POI to the partner and the other from the partner to the POI. After training, they can independently assemble their configuration messages and transmit them to the other when ready. So, these configuration messages, at least in the beginning, are typically independent of and concurrent with the other. Device and/or port capabilities are shared so that a common configuration, e.g., the highest operating parameters for which both ports are capable may be determined.

At 308, depending on whether the POI is downstream only, upstream only, or capable of being both an upstream or a downstream port, it negotiates with the partner to determine who will be the upstream and who will be the downstream port. If the POI is capable of being both an up or a downstream port, then at 309, it determines if the partner is downstream capable. If so, then at 310, it determines if the partner is only capable of being a downstream port. If so, then it recognizes that the partner will be the downstream port and it the upstream port. It then awaits the partners identification and transmission of a suitable common configuration and configures itself to these parameters.

From here, the link is typically ready for communication. Note that these acts may be done at the HW level, for example by a device that supports On-The-Go (OTG) operation. On the other hand, they could be done through system SW, e.g., as part of a bus enumeration process.

If at 310, it was determined that the partner is not only downstream capable, then it goes to 320. Here, it engages in a tiebreak process with the partner. For example, this could involve each port sending a random number in a "tiebreak" field of a configuration message, e.g., with the higher value becoming the downstream and the other the upstream port. The selected downstream port identifies and transmits a suitable (e.g., optimal available) common configuration, and the two ports then configure themselves to this configuration. From here, they are typically able to communicate with each other.

Returning back to 309, if the partner is not downstream capable, then at 316, as the downstream port, the POI identifies a common configuration and transmits it to the partner. The two ports configure themselves in accordance therewith and are typically ready for communication.

Returning back to 308, if the POI is only downstream capable, then the routine proceeds to 312. If the partner is upstream capable, then the routine proceeds to 316 and proceeds as already described. Otherwise, if at 312, it was determined that the partner is not upstream capable (implying that both the POI and partner can only be downstream ports), then the routine proceeds to 322, and the POI would be in a non connection mode.

Returning back to 308, if the POI is only upstream capable, then at 314, it is determined if the partner is downstream capable. If it is downstream capable, then the routine proceeds to 318 and proceeds as already described with the POI being the upstream port, and the partner being the downstream port. On the other hand, if the partner is not downstream capable, then the routine proceeds to 322, and the POI goes into a no connection mode.

Figures 4F, 4G:
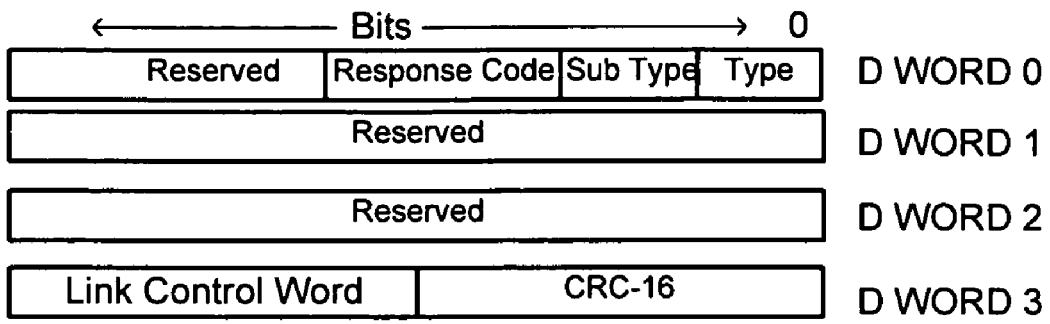

With reference to FIGS. 4A to 4G, a USB 3.0 LMP will be discussed as an example of a configuration message in accordance with embodiments herein. FIG. 4A illustrates a structure for an LMP, and FIG. 4B shows the format for the LMP. The Port Capability LMP (link management packet) conveys each port's link capabilities and is sent by both link partners after the successful completion of training and link initialization. The ports send the LMP within a time (tPortConfiguration) after completion of link initialization. If a link partner does not receive the LMP within that time, then (i) if the link partner has downstream capability, it signals an error, and (ii) if the link partner only supports upstream capability, then the upstream port transitions to a disabled or inactive state, or it may try an alternate protocol if supported by the partner. For example, in the case of a USB 3.0 device, if it fails on system start-up, it will typically try to connect on the USB 2.0 physical link.

After exchanging port capability LMPs, the link partners determine which port is to be configured as the downstream port, as specified in FIG. 4C, which shows a port type selection matrix. If the tiebreaker field contents are equal, then the two link partners will exchange port capability LMPs again, with new and different values in the tiebreaker field. The sequence of tiebreaker field values generated by a port will typically be sufficiently random to break tie situations.

With reference to FIGS. 4D and 4E, the fields that are different from those in the port capability LMP are described herein. Ports that can be a downstream port will generally be capable of sending this type of LMP. If a port that is to be configured as an upstream port does not receive this LMP within the tPortConfiguration time after link initialization, then the upstream port transitions to a disable state (SS.Disabled) and tries to connect at the other speeds supported by the device.

With a pair of port partners, the port that is configured as the downstream port will send the port configuration LMP to the upstream port. The port sending this LMP selects one bit for the Link Speed field. If a downstream capable port cannot work with its link partner, then the downstream capable port signals an error.

With reference to FIGS. 4F and 4G, a Response LMP is discussed. A Response LMP is sent by the upstream port in response to a Port Configuration LMP. It is used to indicate acceptance or rejection of the Port Configuration LMP. It has some of the same fields as the Port Configuration LMP, along with other fields indicated in the tables. If the downstream port does not receive the Response LMP within the tPortConfiguration time, it signals an error. If the Response Code indicates that the Link Speed was rejected by the upstream port, the downstream port signals an error.

Figure 5A:
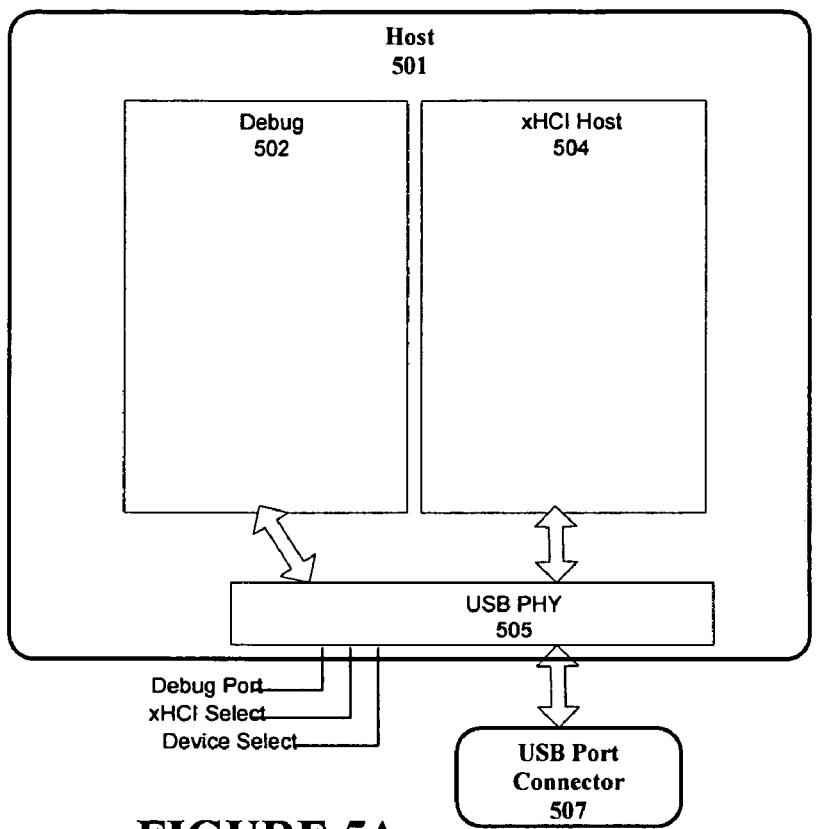
FIGS. 5A-5B are diagrams showing how different computing platforms may be connected together and used to debug one or more of the platforms using controller interfaces with reconfigurable ports in accordance with some embodiments.
Figure 5B:
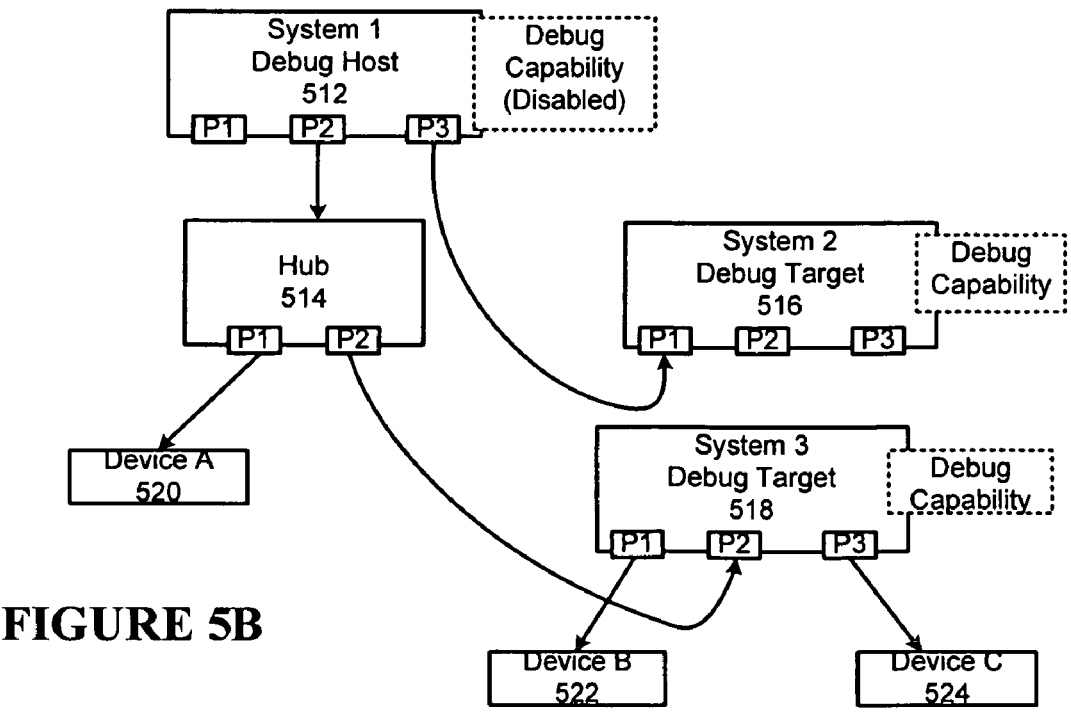

With reference to FIGS. 5A and 5B, as well as back to FIG. 2, a bus host controller, such as xHCI, in cooperation with reconfigurable ports described herein, may provide a debug capability for its host. The flexibility of a reconfigurable port that can be up or down stream can allow for improved host (e.g., personal computer host) debug capability. This can allow for a computer such as a laptop, server or desktop to be plugged into one or more other computers in order to conveniently debug them. Thus, improvements over conventional port-to-port schemes are provided, for example, in that a passive type A to type A crossover cable may be used to achieve such debugging, removing the need for a special cable with active electronics (i.e., a cable with back to back ethernet controllers in the middle of the cable). As presented in the following example, it also allows for systems with debug ports to be placed behind hubs, which may not typically be possible with conventional solutions.

With particular reference to FIG. 5A, the debug capability enables low-level system debug through the port, e.g., USB port through connector 507. This feature provides a means of linking together two host systems (e.g., two personal computers) where one system is to be debugged, a debug target (e.g., system under test), and the other, the debug host, is to perform the debugging.

The reconfigurable port (USB 3.0 port in this example) provides first and second interface options that are selected, e.g., through its physical layer 505 by way of appropriate register bit (e.g., Debug Port, xHCI Select, Device Select) settings. The first interface is the xHCI Host 504, which is the normally selected interface to the Host 501 operating system. The second interface is the Debug interface 502, which can function independently of the xHCI interface 504.

In some embodiments, when enabled, the debug interface is automatically assigned to the first xHCI root hub port that detects an attach of the downstream facing port of a debug host. The root hub port assigned to the debug interface may appear through the overall USB port interface as a fully functional root hub port that never sees a device attach.

In some embodiments, it may work through hubs (e.g., USB hubs) allowing numbers of different host systems to be debugged with a single debugging host. When the debugging is being implemented with xHCI, the debug feature may be chained through the xHCI Extended Capabilities Pointer (XECP) field and may reside in MMIO space. Because the debug interface presents a "device side" (upstream) interface to USB, some of the register definitions in the may appear to be similar to those in the xHCI interface, however, they may have subtle differences, e.g., to support "device side" operation.

With particular reference to FIG. 5B, an exemplary configuration for debugging several hosts is depicted. As shown, multiple debug targets (516, 518) may be attached to a debug host 512. (All of these systems may correspond to the same or different types of platforms, each with RPs such as USB 3.0.) The debug targets enumerate as normal USB devices to the debug host, allowing the debug host to access the targets through the standard USB software stacks.

As indicated here, debug targets may be connected to any downstream port below the debug host (i.e. anywhere in the fabric). However, in some embodiments, a debug target may, in some cases, only connect to a debug host through a root hub port of the target. In this example, Port 1 (P1) of System 2 is attached to a root hub port of System 1 and Port 2 (P2) of System 3 is attached to the downstream facing port of a hub controlled by System 1. Note that other (non-Debug Target) USB devices (e.g., 520 to 524) may also be attached to a debug host or target system. Device A is attached to System 1, and Devices B and C are attached to System 3. All 3 systems support xHCI Debug Capability hardware, software distinguishes a Debug Target from a Debug Host by enabling the Debug Capability on Targets. The Debug Host provides a USB Debug Capability class driver, which may manage Debug Targets when they are enumerated and provide an API for debugger applications.

The Debug Target provides software to manage communications between the Debug Device and the Debug Host. Debug target software interfaces to the debug capability to mange debug device emulation and service debug device class specific requests from the debug host. Note, in some cases, a debug target may only expose its USB debug capability through a root hub port. A debug target is typically connected to a debug host through the downstream facing port of a hub owned by the debug host.

In some embodiments, the debug host (System 1) provides a debug class driver that communicates with the system debug hooks in the debug target, through the debug capability. On the debug target, a debug capability driver may be completely independent of the OS stack driver (xHCI driver, etc.). The debug capability driver may be loaded just after POST so that the OS stack can be debugged. (Note that alternative debug capability implementations can also be in hardware on a target system.) The debug capability driver manages the xHCI debug capability register set, and the standard USB OS stack may manage the non-debug USB devices attached to the system. On the debug host, the xHCI debug capability may be disabled with no driver associated with it. The standard USB OS stack manages the USB devices attached to the system, including the debug device presented by the debug capability driver on the debug target. The user interface through which a programmer may enable a system's xHCI USB debug capability.

In addition, some port embodiments may have the ability to operate using different protocols, e.g., as either a USB 3.0, USB 2.0, or as a PCIe port, for example, or to use encrypted or compressed data. It is a scalable and valuable capability.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A method, comprising:
    initializing a port to a default configuration;
    identifying a range of device capabilities;
    transferring said capabilities to a link partner;
    identifying common capabilities between two partners to be linked; and
    configuring at least one of the partners so that both partners will be at the common configuration, wherein identifying is performed in a selected one of software and hardware.

2. The method of claim 1, in which identifying is done in software.

3. The method of claim 1, in which the identified capabilities comprises operable bus protocols.

4. The method of claim 3, in which operable protocols include USB 3.0 and PCI Express.

5. The method of claim 1, comprising deciding which partner is to be an upstream port and which is to be a downstream port.

6. The method of claim 1, comprising deciding which partner is to be a host port and which partner is to be a debug port.

7. The method of claim 1, comprising deciding which partner is to be a power providing port.

8. The method of claim 1, comprising deciding operating frequency.

9. A device, comprising:
    a reconfigurable port with a controller to:
        initialize a port to a default configuration;
        transmit capabilities to a partner port to be linked;
        receive capabilities from the partner port; and
        reconfigure the port in accordance with capabilities of both ports, wherein said transmitting, receiving, and reconfiguring are to be performed in a selected one of software and hardware.

10. The device of claim 9, in which the port is to determine if it is to be an upstream or downstream port.

11. The device of claim 9, in which the port selects a bus protocol based on bus protocol capabilities of a partner port.

12. The device of claim 9, in which the port is a USB port.

13. The device of claim 10, in which the port decides to be a downstream or upstream port based on whether a partner port can be an upstream or downstream port.

14. The device of claim 13, in which the use a tiebreaker to determine who is to be the downstream port if both ports can either be downstream or upstream ports.

15. A computer system, comprising:
    a host; and
    a reconfigurable port with a host interface to couple the host to a device, and (ii) a debug device interface to enable the host to be debugged, wherein the debug interface has software and hardware modules for performing one of hardware and software debugging.

16. The system of claim 15, in which the reconfigurable port is to be an upstream port when the debug interface is enabled.

17. The system of claim 15, wherein the reconfigurable port comprises a device interface to enable the host as a device to be linked with a second host.

* * * * *

UNITED STATES PATENT AND TRADEMARK OFFICE
CERTIFICATE OF CORRECTION

| | | |
|---|---|---|
| PATENT NO. | : 8,296,469 B2 | Page 1 of 1 |
| APPLICATION NO. | : 12/454155 | |
| DATED | : October 23, 2012 | |
| INVENTOR(S) | : Robert Dunstan et al. | |

It is certified that error appears in the above-identified patent and that said Letters Patent is hereby corrected as shown below:

In Claim 15

Column 8, line 40, should be corrected to read as follows:

host to a device, and a debug device interface to

Signed and Sealed this
Twenty-second Day of January, 2013

David J. Kappos
*Director of the United States Patent and Trademark Office*